April 24, 1928.
T. E. MURRAY, JR
1,667,487
BUTT WELDING
Filed July 21, 1926  3 Sheets-Sheet 1
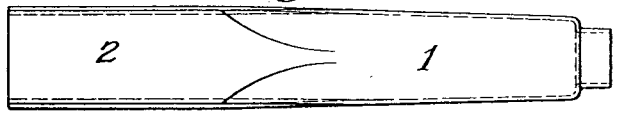
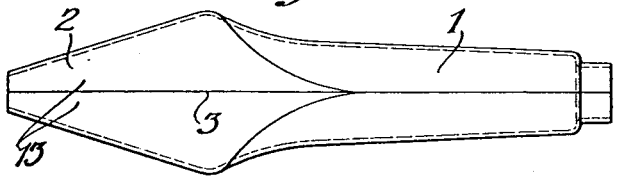
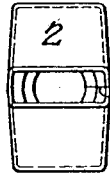 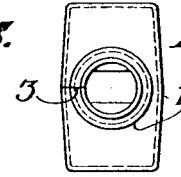
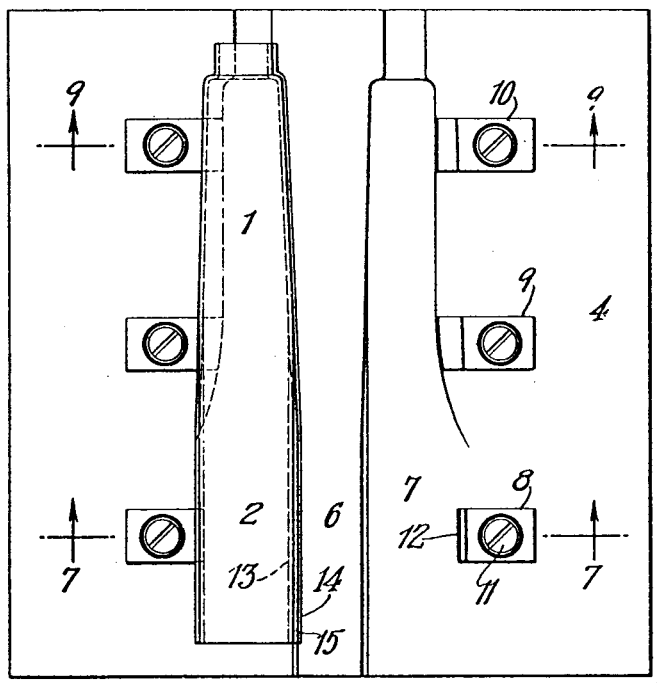
Inventor
Thomas E. Murray Jr.
By His Attorney

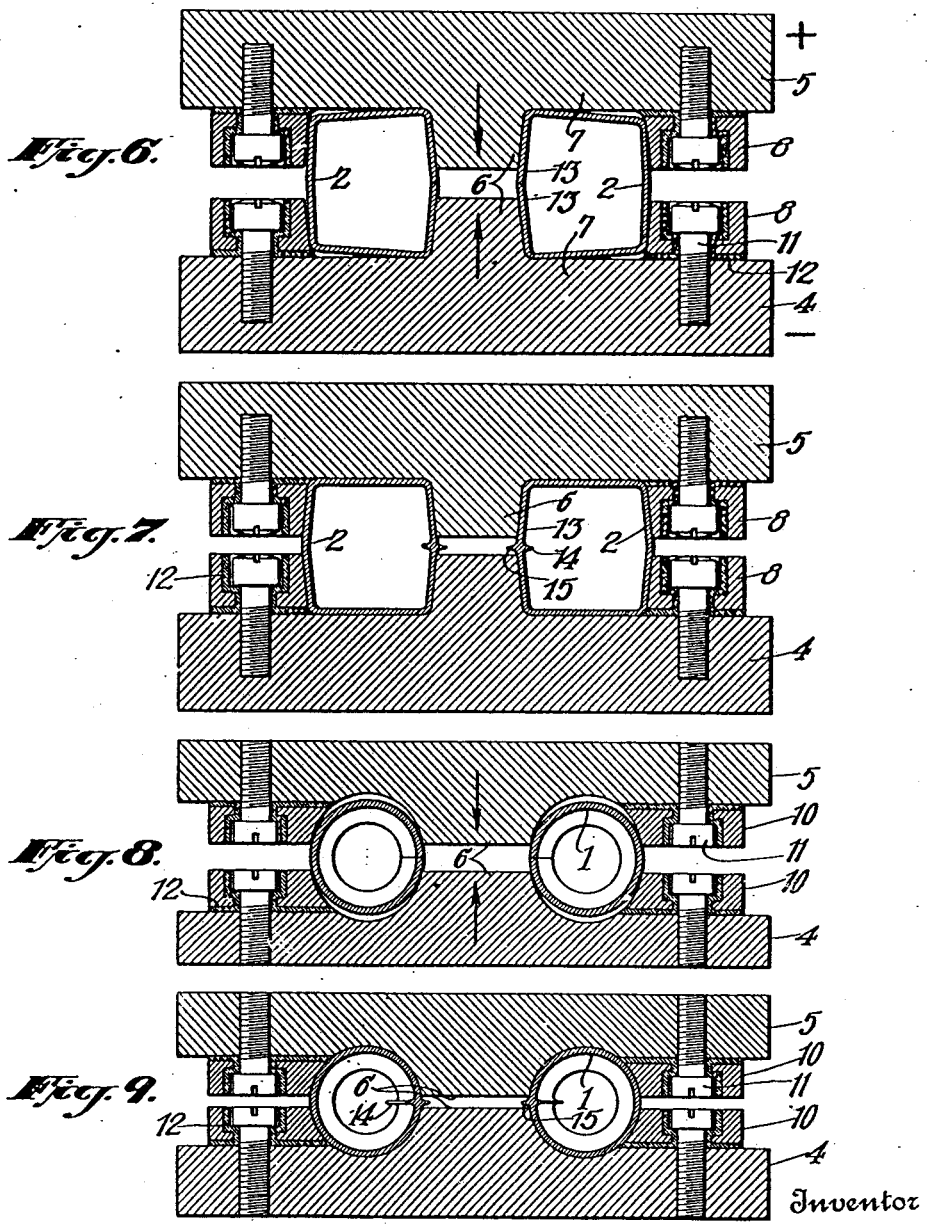

April 24, 1928.
T. E. MURRAY, JR
1,667,487
BUTT WELDING
Filed July 21, 1926
3 Sheets-Sheet 3
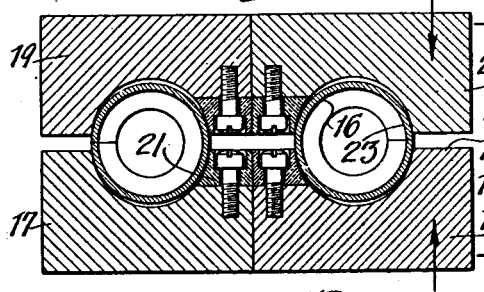
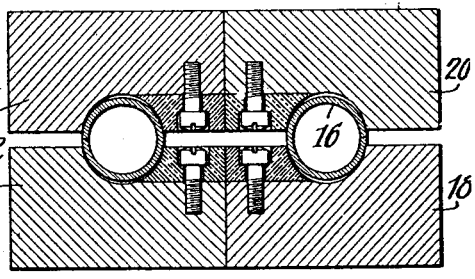
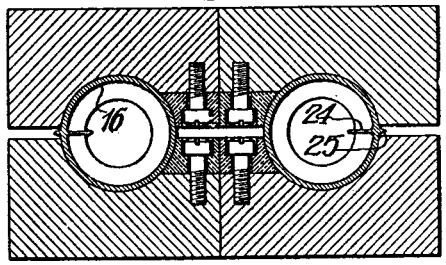
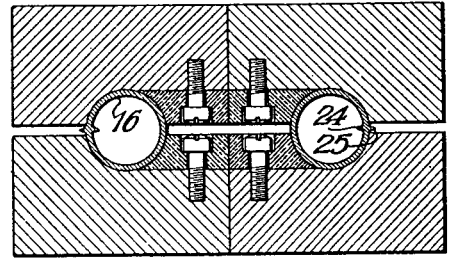
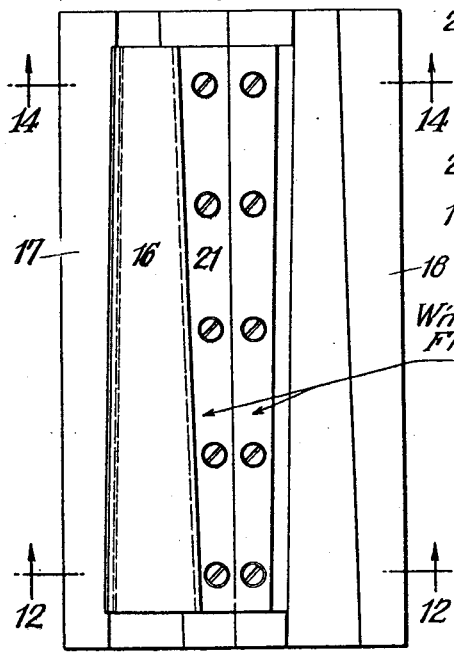
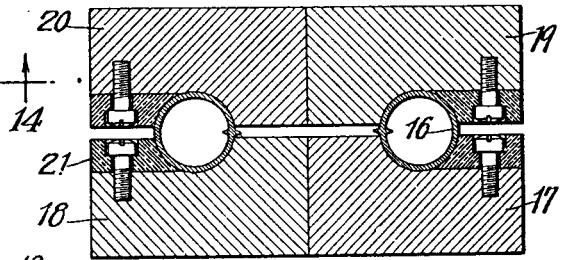
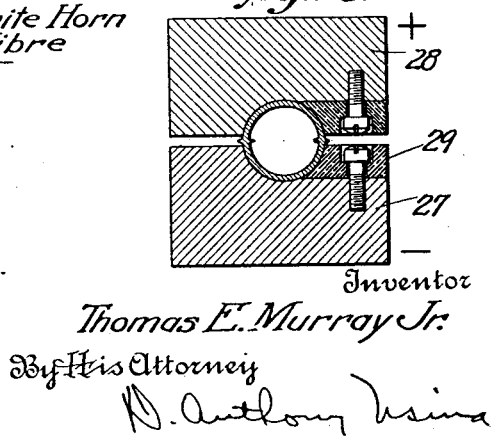
Inventor
Thomas E. Murray Jr.
By His Attorney Patented Apr. 24, 1928.

1,667,487

UNITED STATES PATENT OFFICE.

THOMAS E. MURRAY, JR., OF BROOKLYN, NEW YORK.

BUTT WELDING.

Application filed July 21, 1926. Serial No. 123,845.

My invention aims to provide certain improvements in apparatus and methods for electric butt-welding.

The accompanying drawings illustrate embodiments of the invention.

Figs. 1 and 2 are respectively a plan and side elevation of a hollow steel spoke for automobile wheels;

Figs. 3 and 4 are elevations from opposite ends of Fig. 2;

Fig. 5 is a plan of a lower electrode with one piece of work in place thereon;

Figs. 6 and 7 are vertical cross-sections at different stages in the operation, taken on the plane of the line 7—7 of Fig. 5;

Figs. 8 and 9 are similar cross-sections on the plane of the line 9—9 of Fig. 5;

Fig. 10 is a plan similar to Fig. 5 illustrating the manufacture of a different tubular product;

Figs. 11 and 12 are vertical cross-sections at different stages in the operation taken on the plane of the line 12—12 of Fig. 10;

Figs. 13 and 14 are similar views on the plane of the line 14—14 of Fig. 10;

Fig. 15 is a view similar to Fig. 14 illustrating a modification;

Fig. 16 is a similar view of another modification.

The spoke shown in Figs. 1 to 4 has its outer portion 1 circular in cross-section and slightly conical and its inner portion 2 rectangular in cross-section. It is made from a single piece of sheet metal stamped out of a blank of the required shape and bent around until its edges abut; the abutting edges are then welded along the line 3.

In electrically butt welding hollow articles from one piece of sheet metal, there is a short circuiting of part of the current around the portion of the metal opposite to the joint. This not only increases the quantity of current which has to be applied to make the weld but also adversely affects the quality of the weld at the edges and often prevents any satisfactory welding.

By my present invention this short circuiting is considerably lessened, securing economy, a better weld and a wider range of products which can be made up in this way. The maximum advantage is secured by using the Murray welding process described in the reissue patent of Thomas E. Murray, Jr., No. 15,466 of October 10, 1922, in which the parts to be united are subjected to a current of extremely high ampere strength passed across the joint for a very brief regulated period of time.

The high current and pressure used and the decreased time consumed supplement the other improvements referred to herein and considerably increase the advantage. The speed of production is greatly increased by arranging to weld two or more separate articles at one operation between a single set of electrodes. There are problems in the even distribution of current and pressure and timing occurring when a multiple welding operation is undertaken which do not occur in welding one piece at a time.

The work bent around to approximately the desired shape is placed in grooves in a lower electrode 4. An upper electrode 5 with similar grooves in its under face is brought down on the work as in Fig. 6. The electrodes are arranged to engage the work near the joint with a projecting portion 6, which engages the work and embraces it laterally so as to transmit the current to within a short distance of the joint; the flat portions 7 of the electrodes serving to bear on the top and bottom of the work. At the sides opposite the joints the electrodes are cut away to clear the work and blocks 8, 9 and 10 are fastened on the faces of the electrodes by means of screws 11. These blocks may be of non-conducting material, or they may be of metal with insulating material 12 interposed between them and the electrodes (usually of copper) and screws.

These non-conducting parts or blocks form with the projections 6 of the electrodes grooves which embrace the work, that is, partially surround it so as to hold it against pressures which are lateral to the normal or welding pressure. The parts are formed so that they conform to the desired shape of the finished product and fit the blank continuously along the length of it or at intervals of its length, and serve to shape it or hold the shape of it during the welding operation and until it is removed from the machine.

In the bent blank there is an excess of metal at the edges 13 so that the top and bottom of the blank are not of the finished shape and do not make contact with the electrodes. The contact is confined to a comparatively short distance back from the edges of the work. In the welding operation the parts are pressed together as shown by the arrows in Fig. 6 and a certain quantity of the metal at the edges is extruded in the form of fins 14, 15 which may be afterwards cut or ground off. The final shape is ensured by the form of the electrodes and non-conducting parts.

In the position of Fig. 6, and until very near the end of the operation, there is very little loss of current by short circuit around the joint because of the limited contact on the electrodes.

Because of the distorted shape of the bent blank, so that the electrodes clear it at the top and bottom, there is frequently so slight a short circuiting effect that the desired result can be achieved by merely relieving the electrodes at intervals. For example, the blocks 8 which are located at intervals along the length of the electrodes might be of conducting material in electrical contact with the electrodes so as to be in effect parts thereof; or might be actual parts of the respective electrodes. Being designed to fit the finished product, they would serve chiefly to maintain the necessary lateral pressure; and would make only short and narrow contacts and allow only a slight short circuiting effect. The result is the same, that is, to concentrate the flow of current through the edges to be welded, bringing them quickly to a welding heat and completing the weld, though the concentration at the joint is not quite so great as if these blocks were non-conducting.

Arranging the electrodes horizontally facilitates the welding of two or more pieces of work in one operation. And with two pieces of work, the blocks 8, 9 and 10 may be located at the outer sides where they are most conveniently accessible and can be renewed or changed as desired.

The invention may be applied to other hollow articles than wheel spokes. It is well adapted to the manufacture of one-piece welded tubes and I have shown it in this connection in Figs. 10 to 14 for the making of a tapered tube.

The shape of the tubes is indicated at 16, Fig. 10. The lower electrode is made in two symmetrical halves 17 and 18 which in the welding machine are brought together and held in the position of Figs. 11 to 14. The upper electrode is likewise made in two similar halves 19 and 20 held together in the machine during the welding operation.

Instead of using blocks at intervals, I have illustrated in these figures continuous blocks 21 fastened to the electrodes by screws and I have also illustrated these made of white horn fiber (or it may be other insulating material) so that no special insulation from the electrodes is required. The splitting of each electrode into halves permits the ready application and removal of the blocks 21 on the inner sides of the work-pieces so as to bring the joints thereof to the outer side where they may be rapidly inspected. In this case then the electrodes have projections 22, serving like the projections 6 of Fig. 6 to embrace the work and make contact with it along a comparatively narrow zone near the joint until the weld is completed.

The edge portions 23, Fig. 11, are made with an excess of metal which is taken up and extruded as fins 24, 25 (Fig. 12) in the finished product.

The splitting of the electrodes has the further advantage that they may be reversed as shown in Fig. 15 so as to bring the blocks 21 to the outer sides and provide for more convenient access.

The several features of the apparatus described in connection with Figs. 10 to 15 are applicable also to the apparatus of Figs. 5 to 9, and vice versa. And either design may be used for a variety of products other than those particularly referred to.

The principal features of improvement described may be applied also to the welding of a single hollow product. Fig. 16, for example, shows the welding of a single tube 26 between electrodes 27 and 28, with blocks 29 applied to the relieved side of the electrodes. The electrodes, for example, may be made up from the halves 17 and 19 of the electrodes in Fig. 15. In this figure I illustrate also the making of the product from two segments 30 with two welded joints indicated by extruded metal 31 made in successive operations or in one operation; and such a modification can be effected with the other styles of apparatus referred to.

I have not illustrated in this application the complete welding apparatus. Many types of such apparatus are known which clamp the work in place and start the welding current and effect the necessary pressure and follow up and finally stop the movement of the electrodes and cut off the current at the right time. The present invention may be used with a great variety of such machines.

Various other modifications may be made by those skilled in the art without departing from the invention as defined in the following claims.

What I claim is:—

1. An apparatus for the electric resistance butt welding of hollow products from a single piece, including in combination an electrode engaging the work near the joint continuously along the length of the work and a part exerting lateral pressure on the opposite portion of the work and engaging the work only at intervals along its length.

2. An apparatus for the electric resistance butt welding of hollow products from a single piece, including in combination an electrode engaging the work near the joint continuously along the length of the work and a part exerting lateral pressure on the opposite portion of the work and engaging the work only at intervals along its length, the said parts together embracing the work and fitting the desired cross-section thereof.

3. An apparatus for the electric resistance butt-welding of a plurality of hollow products each from a single piece including in combination an electrode engaging the several bent blanks near their respective joints and continuously throughout the length of the work and parts engaging the several bent blanks at their respective sides opposite the joints and at intervals in the length of the work so as to reduce the quantity of current passing through the parts of the blanks opposite the joints compared with the current passing through the joints.

4. An apparatus for the electric resistance butt-welding of a pair of hollow products each from a single piece, including in combination a pair of electrodes between which the bent blanks may be located with their joints facing each other, the electrodes embracing the several bent blanks near their respective joints and exerting pressure thereon and non-conducting parts engaging the several bent blanks at their respective sides opposite the joints so as to be readily accessible.

5. In the welding of a single piece to form a hollow product, the method which comprises the pressing of the edges together with electrodes which engage the bent blank near the edges and continuously along the length of the work and passing a current across the joint while exerting lateral pressure at the side opposite the joint by means engaging the work only at intervals of its length so as to pass a reduced current through the part of the work opposite the joint compared with that which passes through the joint.

In witness whereof, I have hereunto signed my name.

THOMAS E. MURRAY, Jr.